United States Patent
Hohler et al.

(10) Patent No.: US 10,517,432 B2
(45) Date of Patent: Dec. 31, 2019

(54) FILTER SCREEN MODIFICATION TO IMPROVE FILTRATION PERFORMANCE

(71) Applicant: Henny Penny Corporation, Eaton, OH (US)

(72) Inventors: Melissa M. Hohler, Kettering, OH (US); Thomas M. Smith, Eaton, OH (US); Kendall Lynn Olinger, Eaton, OH (US)

(73) Assignee: Henny Penny Corporation, Eaton, OH (US)

( * ) Notice: Subject to any disclaimer, the term of this patent is extended or adjusted under 35 U.S.C. 154(b) by 590 days.

(21) Appl. No.: 15/276,119

(22) Filed: Sep. 26, 2016

(65) Prior Publication Data

US 2018/0084949 A1    Mar. 29, 2018

(51) Int. Cl.
*A47J 37/12* (2006.01)

(52) U.S. Cl.
CPC ....... *A47J 37/1223* (2013.01); *A47J 37/1285* (2013.01)

(58) Field of Classification Search
CPC .............. A47J 37/1223; A47J 37/1285; A47J 37/1228; A47J 37/1233; A47J 37/129; A47J 37/1295; B01D 29/01; B01D 29/016; B01D 29/031
USPC ......... 99/400, 403, 406, 407, 408, 410, 425, 99/444; 210/167.28, 416.5, DIG. 8
See application file for complete search history.

(56) References Cited

U.S. PATENT DOCUMENTS

| | | | | |
|---|---|---|---|---|
| 4,282,094 A | * | 8/1981 | Mitchell | B01D 37/02 210/167.28 |
| 5,404,799 A | * | 4/1995 | Bivens | A47J 37/1223 134/111 |
| 6,371,307 B1 | * | 4/2002 | Eskes | B01D 39/2055 210/315 |
| 2009/0107344 A1 | * | 4/2009 | Bivens | A47J 37/1223 99/408 |
| 2009/0250414 A1 | * | 10/2009 | Bivens | A47J 37/1223 210/805 |
| 2013/0036919 A1 | * | 2/2013 | Desai | A47J 37/1214 99/404 |
| 2013/0098251 A1 | * | 4/2013 | Lambert | A47J 37/1223 99/408 |

* cited by examiner

*Primary Examiner* — Tu B Hoang
*Assistant Examiner* — Diallo I Duniver
(74) *Attorney, Agent, or Firm* — Wood Herron & Evans LLP

(57) ABSTRACT

A fryer apparatus includes a cooking chamber to hold cooking medium and cook food products within, a filter pan removably attached to the cooking chamber, a tube connecting the filter pan to the cooking chamber, and a pump configured to circulate cooking medium. The filter pan has a bottom wall surrounded by four side walls and an inlet passage configured to receive cooking medium into the filter pan. A filter element is removably attached to the bottom wall of filter pan and extends in a lateral direction along a length of the fryer apparatus and may have two bends spaced laterally from each other. A plug may be attached to the filter element and an outlet passage attached to the plug and configured to discharge the cooking medium.

8 Claims, 5 Drawing Sheets

FILTER SCREEN MODIFICATION TO IMPROVE FILTRATION PERFORMANCE

BACKGROUND

The disclosure relates generally to a filter pan for cooking media systems that use cooking media to cook product in a fryer apparatus, e.g., a pressure fryer or an open fryer, and such fryer apparatus. Specifically, the disclosure relates to a filter pan having a filter element and an air gap formed between filter element and filter pan.

Known fryer apparatus are used to cook various food products, e.g., poultry, fish, potato products, and the like. Such fryer apparatus may include one or more cooking chambers, e.g., fryer pots, which may be filled with a cooking medium, e.g., an oil, a liquid shortening, or a meltable-solid shortening. A pump may circulate the cooking medium throughout. Such fryer apparatus also include a heating element, e.g., an electrical heating element, such as a heating oil medium, or a gas heating element, such as a gas burner and gas conveying tubes, which heat the cooking medium in the cooking chamber. When preparing food in a fryer apparatus, the quality of the cooking medium, e.g., the oil or shortening, may impact the quality of the food that is cooked by the fryer apparatus. As the cooking medium is used to cook food, particles of food may contaminate the cooking medium. The flavor characteristics of each of these food products may become infused to a greater or a lesser degree in the cooking medium. This infusion may adversely affect food quality. Moreover, upon heating the cooking medium, the cooking medium may undergo chemical reactions, e.g., hydrolysis, oxidation, and polymerization.

These chemical reactions and flavor infusions may shorten the useful life of the cooking medium, and may result in more frequent replacement of cooking medium. As many operators of fryer apparatus transition to using more expensive cooking media, i.e., zero trans fat cooking media, replacement of an entire batch of cooking medium may be expensive and time consuming. Thus, known fryer apparatus include filtering mechanisms to remove foreign objects, clumps, and crumbs from the cooking medium, in order to preserve the useful life of the cooking medium. In known fryer apparatus, a paper-type filter is used to filter the cooking medium. This paper-type filter may be fitted over a metal filter grating, in order to prevent the paper-type filter from being drawn down a drainage drain when the cooking medium is drawn out by the filtering system. The paper-type filters have a limited life span and must be changed at periodic intervals. In known fryer apparatus, this process may be difficult, time-consuming, and messy. For this and for other reasons, the operation of changing the filter may result in significant down time, i.e., time out of service, for the fryer apparatus, which is not desirable, particularly in operations in which the fryer apparatus is expected to process a high volume of food products.

SUMMARY OF THE INVENTION

Therefore, a need has arisen for systems and methods for a cooking apparatus that overcome these and other shortcomings of the related art. Specifically, the invention relates to the use of a "creased crumb" filter screen, and a filter pan to engage with the filter screen.

In an embodiment of the invention, a fryer apparatus comprises a cooking chamber configured to hold cooking media and to cook food products therein, a pump to circulate the cooking media, and a filter pan. The filter pan for draining, holding, and filtering cooking medium may include an inlet passage, an outlet passage and several filtering components, which are placed in the bottom of the drain pan. The filtering components include a filter screen, a suction plug attached to the filter screen, a syphon tube attached to the suction plug, and a perforated basket to catch large crumbs.

Other objects, features, and advantages of the present invention are apparent to persons of ordinary skill in the art in view of the following detailed description of the invention and the accompanying drawings.

BRIEF DESCRIPTION OF THE DRAWINGS

For a more complete understanding of the embodiments of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Example embodiments of the present invention, and their features and advantages, may be understood by referring to FIGS. 1-5B, like numerals being used for corresponding parts in the various drawings.

Figure 1:
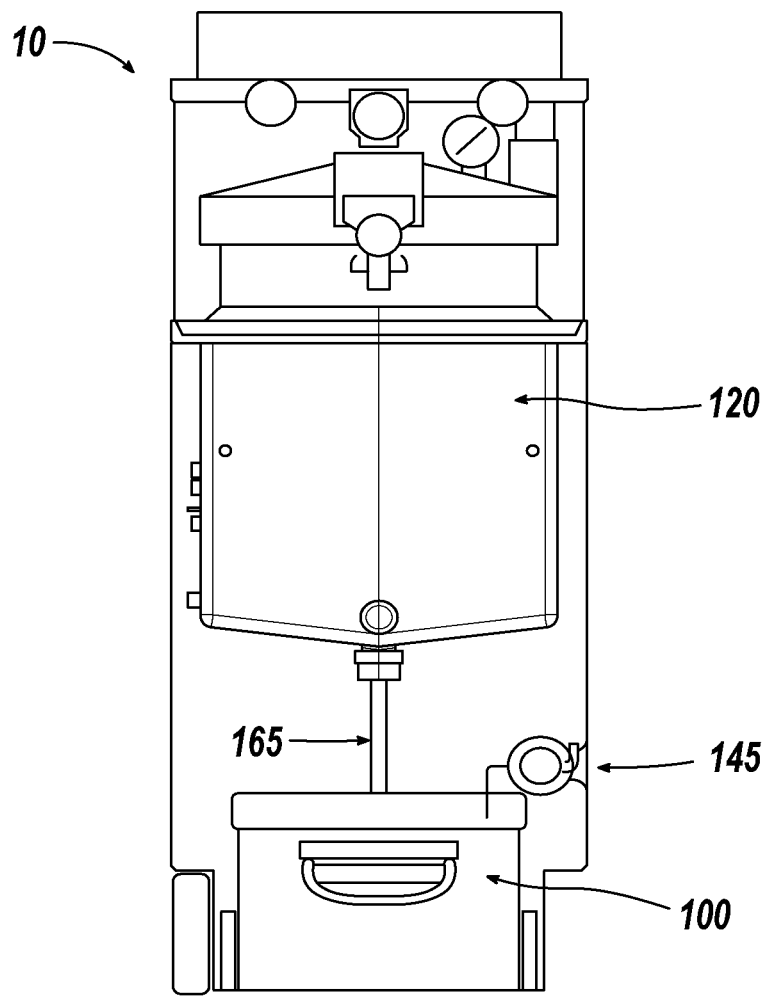
FIG. 1 is a front view of a fryer apparatus, according to an embodiment of the invention.

FIG. 1 depicts a fryer apparatus 10, e.g., a pressure fryer or an open fryer, according to an embodiment of the invention. Fryer apparatus 10 may comprise at least one cooking chamber 120, which may be configured to hold a cooking medium, e.g., an oil, a liquid shortening, a meltable-solid shortening, a semi-solid shortening, or the like. Fryer apparatus 10 also may comprise a filter pan 100 configured to drain, hold, and filter cooking media. Further, fryer apparatus 10 may comprise a connecting tube 165 that creates a pathway for cooking media to be drained from cooking chamber 120 to filter pan 100 to be filtered. Connecting tube 165 may include a drain valve disposed on the pathway from cooking chamber 120 to filter pan 100. Drain valve may open mechanically, or by other suitable actuating mechanism, to allow the cooking medium to gravity drain into filter pan 100. Fryer apparatus 10 may include an opening whereby filter pan 100 may be inserted into and removed from a cavity below cooking chamber 120. Filter pan 100 may slide underneath fryer apparatus 10 by way of rails, or other suitable mechanism, which are part of the frame of fryer apparatus 10.

In addition, fryer apparatus 10 may include return pump 145. When activated, return pump 145 may facilitate movement of the cooking medium through a filter element in filter pan 100, and return filtered cooking medium to cooking chamber 120. Filter pan 100 holds cooking medium when drained and internal components of filter pan 100 filter the cooking medium and help return the cooking medium to cooking chamber 120.

Figure 2:
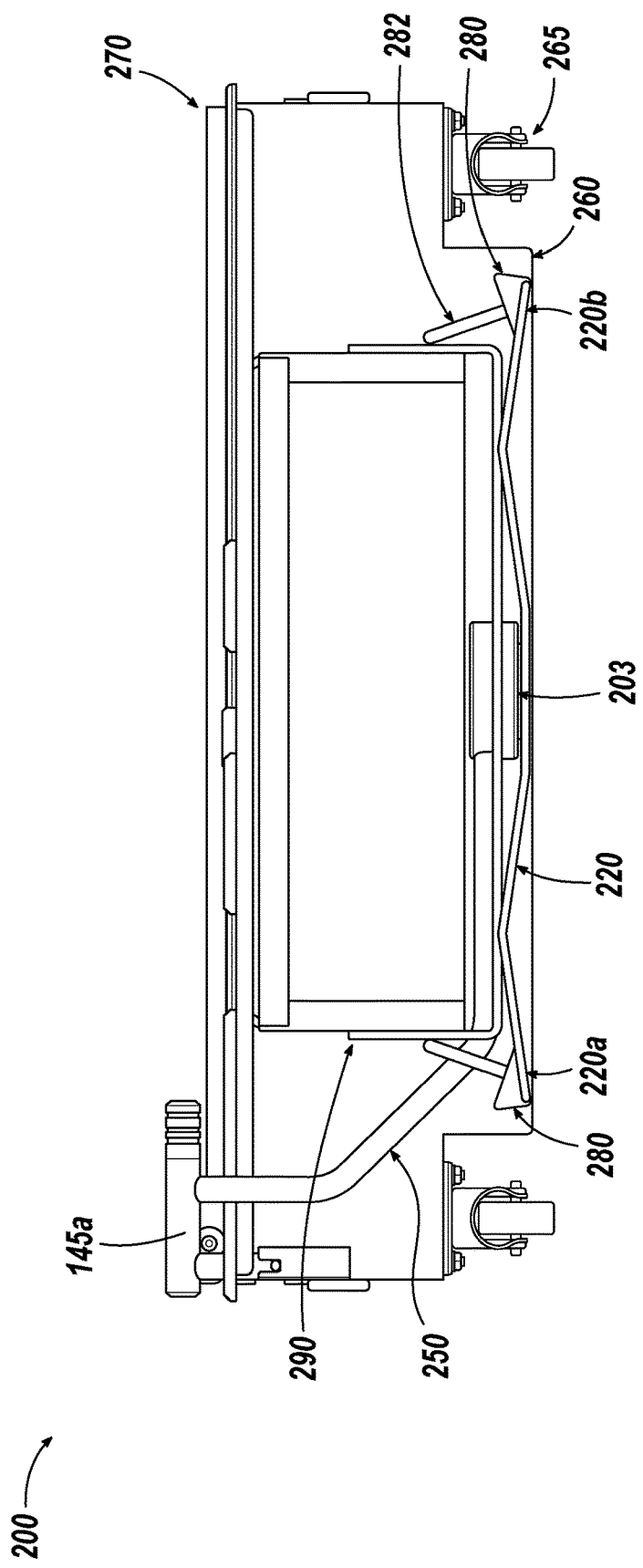
FIG. 2 is a side view of a drain pan with a filter screen attached to a bottom of the drain pan, according to an embodiment.

FIG. 2 depicts a cross-sectional view of filter pan 200 (similar to filter pan 100) and its internal filtering components. These internal filtering components may include a crumb/filter screen, a suction plug, a syphon or return tube, and a basket. Filter screen 220 is attached to, but separate from the body of filter pan 200. Although the cross section of filter pan 200 is depicted as being substantially rectangular, the cross section of filter pan 200 may alternatively be a closed-curve or polygonal shape, e.g., square, circular, elliptical, or triangular. Filter screen 220 may comprise two or more metal mesh surfaces which define a filter cavity therebetween. Alternatively, a single sheet of mesh may be folded upon itself and sealed at three edges to define the filter cavity, or filter screen 220 may comprise a single mesh or woven metal surface. The single mesh or woven metal filter screen 220 may be slipped inside a paper filter or a paper filter may be placed on one side of the filter screen. Paper filter may be attached or secured to filter screen 220 using clips 280 at either end 220a, 220b of filter screen 220. Any other suitable means of attachment may be used which allows filter screen 220 to be removed for cleaning or replacement. Filter clips 280 may have at least one handle 282 or a handle may be omitted Suction plug 203 may be attached to filter screen 220. Suction plug 203 may be attached by welding plug 203 to filter screen 220 or using any other suitable means to attach plug 203 to filter screen 220. Filter screen 220 may include a male connector (not depicted). Suction plug 203 is attached such that plug 203 is centered on filter screen 220. Syphon or return tube 250 may be attached to plug 203. Basket 290, or any other suitable structure for catching large crumbs, may be inserted into filter pan 200 in such a manner that basket 290 straddles syphon tube 250.

Basket 290 may be configured to be removable and may separate crumb particles from the cooking media being filtered, which may increase the useful life of the filter. Basket 290 may comprise any suitable material or shape suitable for catching large crumb particles. Basket 290 may have a plurality of handles affixed thereto or other suitable mechanism to allow a user to remove basket 290 for crumb removal and cleaning.

Syphon or return tube 250 may be formed along a bottom portion 260 of filter pan 100. Although bottom portion 260 of filter pan 200 is depicted as being substantially flat, bottom portion 260 may have an alternative design, e.g., a convex portion, a concave portion, ridges, or indentations, to alter the flow of cooking media during filtration. Upon operation of return pump 145, syphon tube 250 may be configured to draw filtered cooking media from filter pan 200 and return cooking media to cooking chamber 120 via syphon tube 250. In the embodiment of FIG. 2, syphon or return tube 250 has an L-shape, extending along bottom 260 before bending and extending towards top of filter pan 200 at end 220a.

Filter pan 200 may include pan cover 270, as depicted in FIG. 2. Cover 270 may be placed over filter pan 200 and may include a latch assembly (not depicted in FIG. 2) to secure cover 270 to filter pan 200. Cover 270 may be configured to minimize splashing of cooking media as the cooking media drains from cooking chamber 120 to filter pan 200. Although cover 270 is depicted as substantially flat and rectangular in FIG. 2, cover 270 may be an alternative closed-curve or polygonal shape, e.g., square, circular, elliptical, or triangular, or may have a convex or concave design. Cover 270 may be configured to be removable from filter pan 200 to allow for servicing of the filter, e.g., replacing or cleaning filter screen 220, cleaning or removing basket 290, or cleaning filter pan 200. Cover 270 may include a handle (not depicted) to assist in removing cover 270 from filter pan 200.

FIG. 2 depicts filter pan 200 with filter screen 220 coupled to bottom portion 260 of filter pan 200, according to an embodiment. Filter pan 200 may have a transporting mechanism 265 to assist in moving filter pan 200. In an embodiment, transporting mechanism 265 may be casters, as depicted in FIG. 2. In other embodiments, transporting mechanism 265 may be a different transporting device, e.g., wheels without caster, sliders, ball casters, rollers, or the like.

Figure 3A:
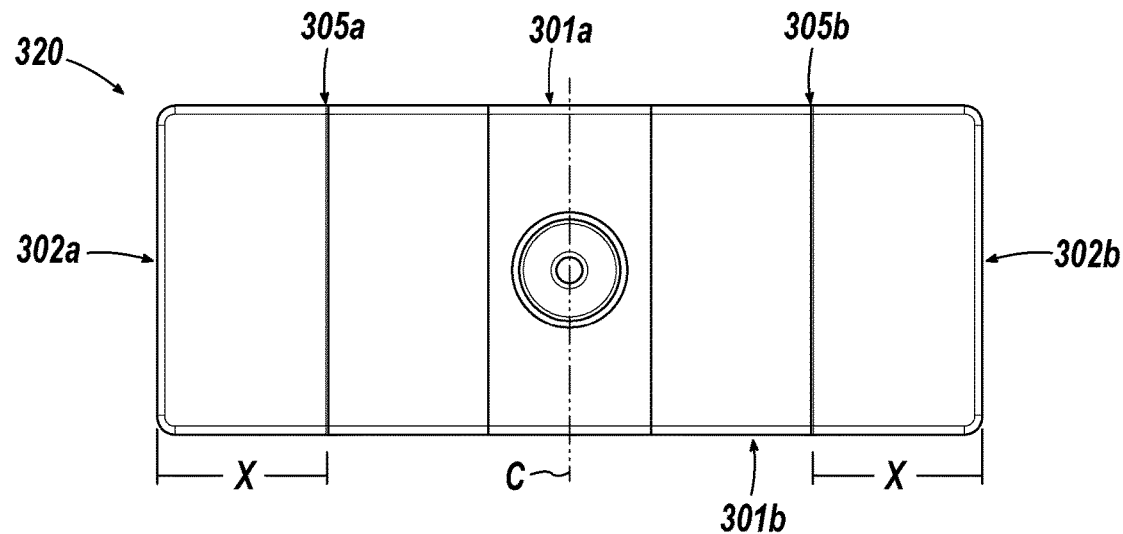
FIG. 3A is a top view of a filter screen, according to an embodiment.
Figure 3B:
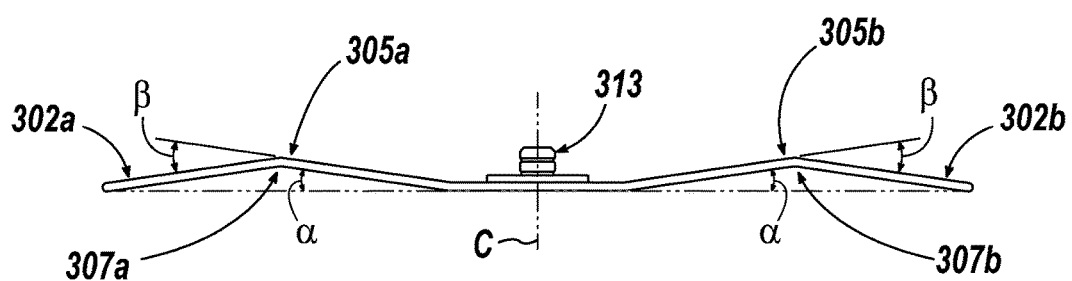
FIG. 3B is a cross-sectional view of a filter screen, according to an embodiment.

FIGS. 3A and 3B depict a filter screen 320 (similar to filter screen 220) according to an embodiment. Although filter screen 320 is depicted as rectangular with sides 301a, 301b and ends 302a, 302b in FIG. 3A, filter screen 320 may alternative be a closed-curve or polygonal shape, e.g., square, circular, elliptical, or triangular, or may have a three-dimensional design, e.g., sphere, cylinder, cube, or cone. Suction plug (not depicted) may be welded to a center (C) of filter screen 320 and filter screen 320 is depicted with male connector 313 for receiving suction plug 303. Filter screen 320 may be configured such that it creates an air gap adjacent to plug 303, and between bottom portion 260 of filter pan 200 and attached filter screen 320. The air gap, which creates a sump area, prevents suction created by operation of the pump from drawing a filter down flat against a flat bottom surface of a drain pan. This air gap and resulting sump area allows the pump to operate as if there is very little accumulated sediment or obstruction on filter screen 320. This results in very fast cooking chamber refill times and refill times that remain very fast throughout the course of the day. A user can now cook all day without needing to change the filter paper or clean the drain pan and an increased number of filtrations may occur before replacement is necessary. The filtering process time, especially pot/chamber refill time, is not diminished, and may be as fast as the first filter of the day. A user may only need to empty the large crumb basket once or twice a day if extremely large volumes of product are cooked.

In the embodiment illustrated in FIG. 3B, first bend 305a may be formed in filter screen 320 between end 302a and center (C) of filter screen 320. Second bend 305b may be formed in filter screen 320 between center (C) and end 302b of filter screen 320. Adding bends 305a and 305b to filter screen 320 results in a "teepee" shape of filter screen 320 forming a 'creased crumb' screen. Bends 305a, 305b may be added laterally at each end of filter screen 320, with one bend added on each side of suction plug 303, which may be centered on filter screen 320. Bends 305a, 305b in filter screen 320 creates an air gap 307a, 307b on the underside of filter screen 320 and on each side of suction plug 303. Although filter screen 320 is depicted with two bends in FIG. 3B, any suitable number of bends may be formed in filter screen 320, or any other suitable mechanism may be employed to create a sump area to break the suction created by operation of a pump that pulls a filter screen flat against a bottom of a drain pan. In the embodiment of FIG. 3A, filter screen 320 may have a length of approximately 22 inches in a lateral direction. Lateral distance x from end 302a, 302b to peak of bend 305a, 305b may be approximately 4.25 inches. Angle $\alpha$ in FIG. 3B may be approximately 8° and angle $\beta$ in FIG. 3B may be approximately 15°.

Figure 4:
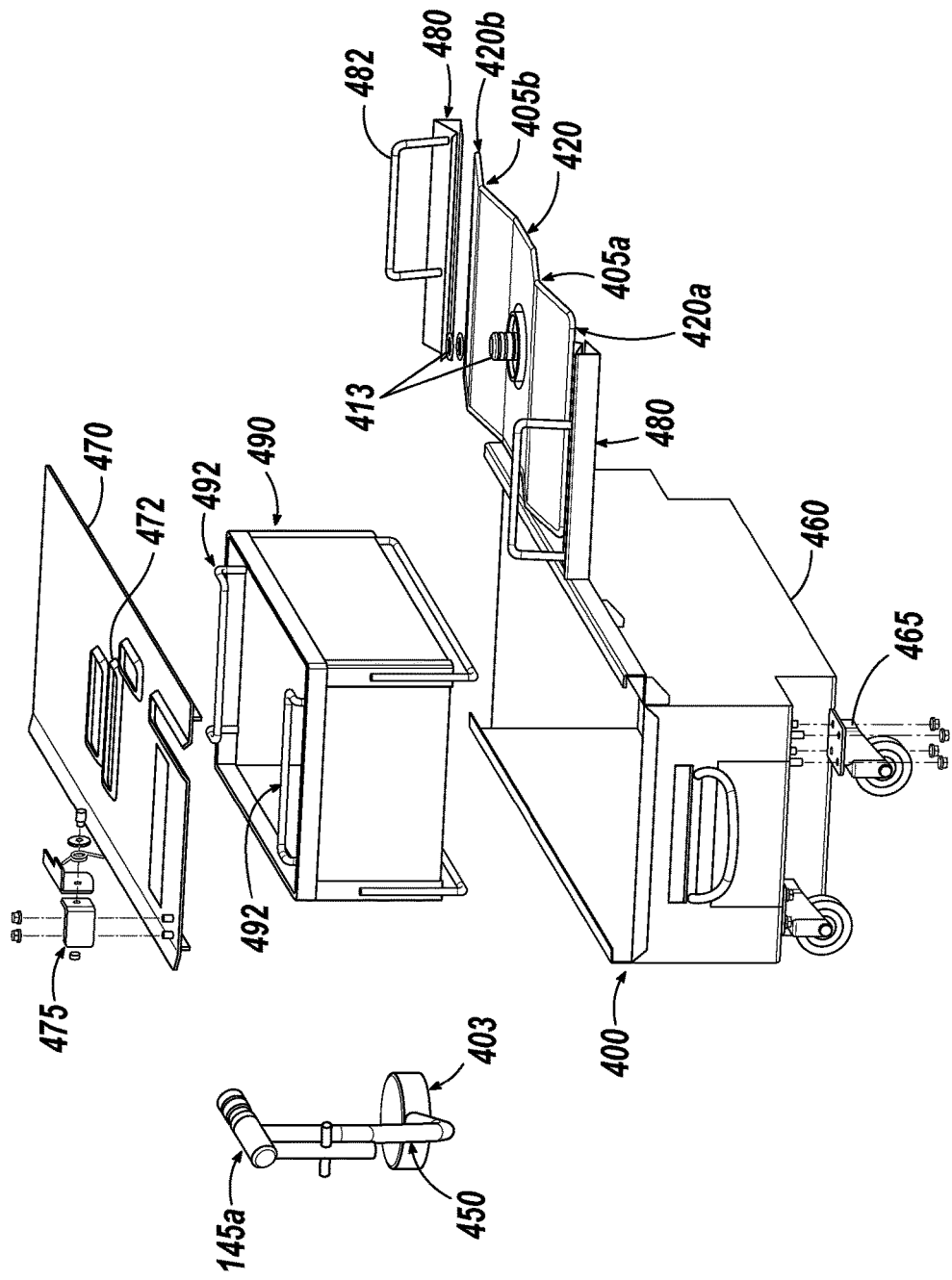
FIG. 4 is an exploded view of an assembled filter pan, according to an embodiment.

FIG. 4 depicts an exploded view of a filter pan 400 and filter element 420, according to an embodiment. Filter pan 400 includes a bottom portion 460 as with the previously-described embodiment and also includes a transporting mechanism 465 to assist in moving filter pan 400. In an embodiment, transporting mechanism 465 may be casters, as depicted in FIG. 4. In other embodiments, transporting mechanism 465 may be a different transporting device, e.g., wheels without caster, sliders, ball casters, rollers, or the like. Filter pan 400 is depicted in FIG. 4 as being substantially rectangular. However, in other embodiments, filter pan 400 may be an alternative closed-curve or polygonal shape, e.g., square, circular, elliptical, or triangular, or any suitable shape.

Filter screen 420, as depicted in FIG. 4, may be a woven metal screen slipped inside a paper filter and clips 480, which may include a handle 482 as shown in FIG. 4, may be used to secure paper filter to filter screen 420. In other embodiments, filter screen 420 may comprise two or more metal mesh surfaces which define a filter cavity therebetween. Alternatively, a single sheet of mesh may be folded upon itself and sealed at three edges to define the filter cavity, or filter screen 420 may comprise a single mesh surface. Filter screen 420, as depicted by FIG. 4, includes first bend 405a and second bend 405b. First bend 405a may be formed laterally between end 420a and male connector 413. Second bend 405b may be formed laterally between male connector 413 and end 420b. Adding bends 405a and 405b to filter screen 420 results in a "teepee" shape of filter screen 420 forming a 'creased crumb' screen. In other embodiments, filter screen 420 may include any suitable means for creating a sump area and preventing suction from forming or beginning to form.

Syphon or return tube 450 may be connected to an outlet of suction plug 403. Syphon or return tube 450 may also be connected to an inlet of return pump 145. Connectors may be configured to removably seal syphon tube 250 to an outlet of suction plug 203 and an inlet 145a of return pump 145 for returning filtered cooking media to cooking chamber 120 upon operation of return pump 145. Syphon or return tube 450 may be connected to an outlet of suction plug 403 and to an inlet of return pump 145 by any suitable connector, such as two o-rings to seal syphon tube 250 to the inlet of return pump 145, fewer or greater than two o-rings, or other alternative connector mechanism, e.g., a threaded attachment, a sealant, a dairy union connector, a gasket, or the like.

Filter pan 400 may include pan cover 470, as depicted in FIG. 4. Cover 470 may be placed over filter pan 400 and may include a latch assembly 475 to secure cover 470 to filter pan 400. Cover 470 may be configured to minimize splashing of cooking media as the cooking media drains from cooking chamber 120 to filter pan 400. Although cover 470 is depicted as substantially flat and rectangular in FIG. 4, cover 470 may be an alternative closed-curve or polygonal shape, e.g., square, circular, elliptical, or triangular, or may have a convex or concave design. Cover 470 may be configured to be removable from filter pan 400 to allow for servicing of the filter, e.g., replacing or cleaning filter screen 420, cleaning or removing basket 490, or cleaning filter pan 400. Cover may include a handle (not depicted) to assist in removing cover 470 from filter pan 400. An opening 472 may be formed in cover 470 to allow cooking media to gravity drain from cooking chamber 120 via connecting tube 165 into filter pan 400.

Basket 490 may be configured to be removable and may separate crumb particles from the cooking media being filtered, which may increase the useful life of the filter. In an embodiment, basket 490 may comprise perforated sheet metal, bent in the shape of a four-sided box with an open end facing upward. In other embodiments, basket 490 may have greater or fewer than four sides and may be formed in alternative shapes. Basket 490 may have a plurality of handles affixed thereto. For example, as depicted in FIG. 4, basket 490 may have two handles 492 welded to the front and rear sides of basket 490 to allow a user to remove basket 490 for crumb removal and cleaning. In other embodiments, basket 490 may have fewer or greater than two handles, or the handles may be omitted, and handles may be attached by alternative means, e.g., screws, clasps, clips, adhesive, or the like.

Figure 5A:
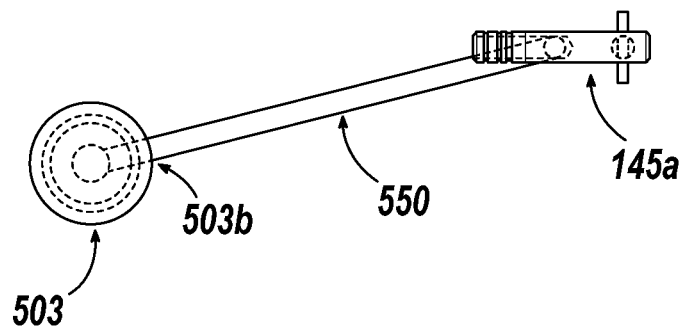
FIG. 5A is a top view of a suction plug and tube, according to an embodiment.
Figure 5B:
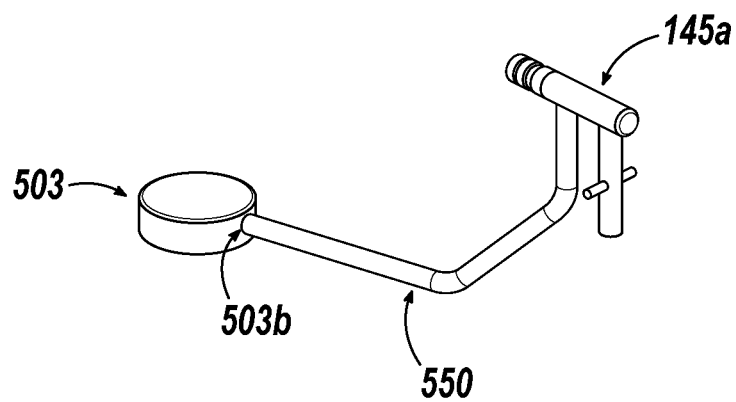
FIG. 5B is a perspective view of a suction plug and tube, according to an embodiment.

FIGS. 5A and 5B depict a syphon or return tube 550 connected to outlet 503b of suction plug 503 and inlet 145a of return pump 145. A watertight connection may be formed between syphon tube 550 and suction plug 503. Syphon or return tube 550 may be connected to outlet 503b of suction plug 503 and inlet 145a of return pump 145 using any suitable connector for forming a watertight connection, including two o-rings, fewer or greater than two o-rings, or other alternative connector mechanism, e.g., a threaded attachment, a sealant, a dairy union connector, a gasket, or the like.

To service a filter apparatus, according to an embodiment, a user may first pull filter pan 200 out from the underneath fryer apparatus 10, a process that may require no tools or additional operations to disengage syphon tube 250 from the inlet of return pump 145. With filter pan 200 withdrawn from underneath fryer apparatus 10, a user may then remove cover 270 to access basket 290, suction plug 203, and filter screen 220. The basket 290 may be removed and foreign material within the basket may be quickly discarded. A user may first disengage syphon tube 250 and suction plug 203, then lift filter screen 220 out of filter pan 200 and remove paper filter surrounding filter screen 220. With filter screen 220 holding the foreign material, a user may transport the filter and foreign material to a disposal location. Most of the foreign material may be contained by basket 290 and filter screen 220, and the removal of the foreign material from filter pan 200 would be achieved substantially during the servicing of these two items. Any foreign material still remaining within filter pan 200 may be quickly removed for disposal. With filter pan 200 clean of foreign material, a user then may place a clean paper filter around filter screen 220 and connect filter screen 220 at bottom portion 260 of filter pan. Suction plug 203, syphon tube 250, basket 290, and cover 270 may then be put back on and filter pan 200 may be slid back underneath cooking chamber 120 in fryer apparatus 10, which re-establishes the connection between syphon tube 250 of filter pan 200 and the inlet of return pump 145. Because filter pan 200 with "teepee" shaped creased filter screen 220 does not accumulate as quickly as flat filters, the user may need to service the filter screen 220 and filter pan 200 less frequently than with known filter pan designs. This reduces the amount of time spent associated with the filter replacement process, allowing the user to spend more time with other activities associated with food preparation.

While the invention has been described in connection with example embodiments, it will be understood by those of ordinary skill in the art that other variations and modifications of the example embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A fryer apparatus, comprising:
   a cooking chamber configured to store cooking medium therein and to cook food products therein;
   a filter pan removably attached to the cooking chamber, the filter pan comprising:
   a bottom wall surrounded by four side walls;
   an inlet passage configured to receive a cooking medium;
   a filter element configured to filter the cooking medium before it is discharged, wherein the filter element is configured to be removably attached to the bottom wall and extends in a lateral direction along a length of the filter pan;
   a plug attached to the filter element, wherein the filter element is configured to create an air gap between the bottom wall and the filter element, wherein the air gap is lateral to the plug; and
   an outlet passage attached to the plug and configured to discharge the cooking medium; and
   a pump configured to circulate the cooking medium in the fryer apparatus between the filter pan and the cooking chamber,
   wherein the filter element comprises:
   a first end;
   a second end opposite the first end, wherein the second end is spaced apart from the first end by a distance along the lateral direction;
   a center located between the first and second ends, wherein the plug is attached to the filter element at the center;
   a first bend formed in the filter element between the first end and the center; and
   a second bend formed in the filter element between the second end and the center, wherein the filter element defines portions on opposite sides of the first and second bends that are oriented at a non-zero angle from a plane parallel to the bottom wall of the filter pan such that the portions of the filter element extend away from and towards the bottom wall on opposite sides of each of the first and second bends, thereby generating the air gap so as to be defined by a larger spacing of the filter element from the bottom wall adjacent the first and second bends as compared to a spacing between the filter element and the bottom wall adjacent the first and second ends.

2. The fryer apparatus of claim 1, wherein the plug is centered on the filter element.

3. The fryer apparatus of claim 1, wherein the filter element comprises a woven metal screen.

4. The fryer apparatus of claim 3, wherein the screen is configured to be placed inside a paper filter.

5. The fryer apparatus of claim 1, further comprising a basket inserted in the filter pan, wherein the basket is configured to catch large crumbs.

6. The fryer apparatus of claim 1, further comprising a lid configured to cover the filter pan, wherein the inlet passage is formed in the lid.

7. The fryer apparatus of claim 1, wherein the filter element comprises a teepee shape.

8. The fryer apparatus of claim 1, wherein the plug is welded to the filter element.

* * * * *